(12) United States Patent
Greene et al.

(10) Patent No.: US 7,380,369 B1
(45) Date of Patent: Jun. 3, 2008

(54) INSECT TRAP AND METHOD OF USE

(76) Inventors: Uril G Greene, 27 River Ridge Trail, Ormond Beach, FL (US) 32174; Alan Thomas Greene, 27 River Ridge Trail, Ormond Beach, FL (US) 32174; Aisha Mirette Greene, 27 River Ridge Trail, Ormond Beach, FL (US) 32174

( * ) Notice: Subject to any disclaimer, the term of this patent is extended or adjusted under 35 U.S.C. 154(b) by 22 days.

(21) Appl. No.: 11/350,339

(22) Filed: Feb. 8, 2006

Related U.S. Application Data (63) Continuation-in-part of application No. 10/796,001, filed on Mar. 10, 2004, now abandoned.

(51) Int. Cl.
*A01M 1/24* (2006.01)
*A01M 1/02* (2006.01)
*A01M 1/10* (2006.01)

(52) U.S. Cl. ............................... 43/119; 43/107; 43/122
(58) Field of Classification Search ................. 43/107, 43/122, 139, 119, 112
See application file for complete search history.

(56) References Cited

U.S. PATENT DOCUMENTS

| | | | | |
|---|---|---|---|---|
| 882,631 A * | 3/1908 | Fuller | ........................... | 43/119 |
| 1,120,046 A * | 12/1914 | Fritsch | ........................ | 43/119 |
| 1,167,855 A * | 1/1916 | Stipp | ........................... | 43/119 |
| 1,334,099 A * | 3/1920 | Johnson | ........................ | 43/119 |
| 1,340,779 A * | 5/1920 | Lee | ............................... | 43/119 |
| 1,411,189 A * | 3/1922 | Samuelson | .................. | 43/119 |
| 1,456,413 A * | 5/1923 | Webster | ....................... | 43/119 |
| 1,475,357 A * | 11/1923 | Weber | .......................... | 43/119 |
| 1,651,999 A * | 12/1927 | Coglon | ......................... | 43/112 |
| 1,812,512 A * | 6/1931 | Carballo | ....................... | 43/119 |
| 1,870,712 A * | 8/1932 | Crown | .......................... | 43/119 |
| 1,880,988 A * | 10/1932 | Smith | ........................... | 43/119 |
| 1,910,623 A * | 5/1933 | McWilliams et al. | ......... | 43/112 |
| 1,951,289 A * | 3/1934 | Menze et al. | ................. | 43/119 |
| 1,981,951 A * | 11/1934 | Folmer | .......................... | 43/112 |
| 2,001,414 A * | 5/1935 | Folmer et al. | ................ | 43/112 |
| 2,030,310 A * | 2/1936 | McWilliams et al. | ......... | 43/112 |
| 2,042,236 A * | 5/1936 | Moye | ........................... | 43/119 |

(Continued)

FOREIGN PATENT DOCUMENTS

JP 07203821 A * 8/1995

(Continued)

*Primary Examiner*—Darren W Ark
(74) *Attorney, Agent, or Firm*—Paul S. Rooy (57) ABSTRACT

An insect trap and method of use. The insect trap has a roof, side walls, rear wall, front wall, and floor. The front wall has a front wall aperture, and the rear wall has at least one rear wall aperture. A plurality of dividers are disposed within the insect trap, with a divider aperture associated with each divider. The divider apertures alternate between being adjacent the floor and adjacent the roof in successive dividers. The method includes the steps of mounting an insect trap in a structure opening, allowing insect-enticing chemicals to waft from inside the structure opening to outside the structure opening through the insect trap, enticing the insect through a front wall aperture, divider apertures, and into an inner chamber adjacent the rear wall, and entrapping the insect within the inner chamber because the rear wall apertures are too small to admit passage to the insect.

20 Claims, 4 Drawing Sheets

U.S. PATENT DOCUMENTS

| | | | | |
|---|---|---|---|---|
| 2,080,242 | A * | 5/1937 | Ward | 43/112 |
| 2,095,323 | A * | 10/1937 | Di Marino | 43/112 |
| 2,117,767 | A * | 5/1938 | Lindsley | 43/112 |
| 2,123,127 | A * | 7/1938 | Whipple | 43/112 |
| 2,177,846 | A * | 10/1939 | Swangren | 43/112 |
| 2,181,595 | A * | 11/1939 | Bruce | 43/119 |
| 2,218,369 | A * | 10/1940 | Whipple | 43/112 |
| 2,278,538 | A * | 4/1942 | Dubilier | 43/112 |
| 2,350,519 | A * | 6/1944 | Olson | 43/119 |
| 3,077,050 | A * | 2/1963 | Makara | 43/119 |
| 4,662,103 | A * | 5/1987 | Cheng | 43/132.1 |
| 4,908,978 | A * | 3/1990 | Zacharias | 43/112 |
| 5,123,201 | A * | 6/1992 | Reiter | 43/107 |
| 5,133,150 | A * | 7/1992 | Briese | 43/122 |
| 5,157,866 | A * | 10/1992 | Rosie | 43/107 |
| 5,239,771 | A * | 8/1993 | Beardsley | 43/119 |
| 5,241,779 | A * | 9/1993 | Lee | 43/139 |
| 5,347,748 | A * | 9/1994 | Moreland et al. | 43/107 |
| 5,799,436 | A * | 9/1998 | Nolen et al. | 43/112 |
| 6,050,025 | A * | 4/2000 | Wilbanks | 43/112 |
| 6,164,009 | A * | 12/2000 | Clarke | 43/122 |
| 6,185,861 | B1 * | 2/2001 | Perich et al. | 43/107 |
| 6,209,256 | B1 * | 4/2001 | Brittin et al. | 43/122 |
| 6,305,122 | B1 * | 10/2001 | Iwao et al. | 43/112 |
| 6,341,444 | B1 * | 1/2002 | Cina et al. | 43/119 |
| 6,474,014 | B1 * | 11/2002 | Yu | 43/119 |
| 6,530,172 | B2 * | 3/2003 | Lenz | 43/112 |
| 6,591,545 | B2 * | 7/2003 | Brunet | 43/112 |
| 6,678,995 | B1 * | 1/2004 | Carviel | 43/107 |
| 6,874,273 | B1 * | 4/2005 | Weisenburg, III | 43/119 |
| 7,036,269 | B1 * | 5/2006 | Chen et al. | 43/139 |
| 7,073,287 | B2 * | 7/2006 | Lau | 43/112 |
| 2003/0208952 | A1 * | 11/2003 | Dible | 43/107 |
| 2005/0044777 | A1 * | 3/2005 | Hiscox | 43/139 |
| 2005/0284016 | A1 * | 12/2005 | Greene et al. | 43/122 |
| 2007/0144056 | A1 * | 6/2007 | Gleason, Jr. | 43/112 |

FOREIGN PATENT DOCUMENTS

| | | | |
|---|---|---|---|
| JP | 11346628 A | * | 12/1999 |
| JP | 11346629 A | * | 12/1999 |
| JP | 2005073648 A | * | 3/2005 |
| JP | 2005095149 A | * | 4/2005 |
| JP | 2005229932 A | * | 9/2005 |
| WO | WO 2005048702 A1 | * | 6/2005 |

* cited by examiner

INSECT TRAP AND METHOD OF USE

This application is a Continuation-In-Part of U.S. patent application Ser. No. 10/796,001 filed Mar. 10, 2004 now abandoned, and claims the benefit of the earlier filing date of that application.

BACKGROUND OF THE INVENTION

1. Field of the Invention

This invention relates to pest control, and in particular to an insect trap and method of use.

2. Background of the Invention

Insects can be a major problem when uncontrolled. Although numerous species of benevolent insects exist, others can present a health hazard to humans. For example, mosquitoes spread malaria and yellow fever through their blood sucking feeding habits. Flies may carry disease, germs and infection by landing on food subsequently eaten by humans. Thus it would be desirable to reduce or eliminate these, and other harmful, types of insects from inside structures occupied by humans, and from the environs of same.

It is known that insects such as mosquitoes are attracted by carbon dioxide exhaled by humans, by lactic acid and many other chemicals emitted from humans and their living environment, and even by movement by humans. These chemicals are produced by the human body, by the bacteria on the skin, as well as trace materials human bodies have come in touch with. Mosquitoes may respond to several stimuli at once, and each species of mosquito seems to have particular preferences of stimuli and attractants.

Thus, it would be desirable to provide an insect trap and method which would attract and entrap harmful insects. It would be desirable to position such insect trap within a structure opening, so that carbon dioxide exhaled by humans, lactic acid and other chemicals emitted from humans could emanate outwards from, and insects be attracted into, the insect trap.

Existing Designs

A number of patents have issued for insect traps. Numerous among them have used screen material as insect trap walls. For example, U.S. Pat. No. 1,411,189 was issued to Samuelson for a fly-trapping window screen. This design taught nipples through which flies were expected to crawl, even though the nipples provided minimal clearance. The nipples led into fly-trapping chambers, within which flies accumulated. While this design provided means for entrapping flies, the small nipple passage size may have reduced the number of flies actually trapped. In addition, a large number of entrapment chambers were taught, thus rendering removal of the dead flies difficult.

U.S. Pat. No. 6,305,122 was granted Iwao et al. for a mosquito killing apparatus. One embodiment of this apparatus was taught to be mountable in a window. This design relied on a power supply running an electroshock unit, which would electrify those insects unfortunate enough to come into contact with it. While this mosquito killing apparatus may have been effective against mosquitoes or other insects coming into contact with the electroshock unit, it required a power supply, and suffered from the disadvantages of complexity, and its associated cost.

Cheng was granted U.S. Pat. No. 4,662,103 for a dripping evaporation type of insect luring device. This design taught permeating a cork base with insecticide, which had the quality of being attractive to insects. The smell of the insecticide was taught to disperse into the nearby atmosphere, attract insects, and kill them after they partook of the insecticide. This design suffered from a number of disadvantages. First, insecticide was required to be used as a lure for insects. This required that insecticide be purchased, stocked, and periodically be replaced in the apparatus itself—with the associated labor, cost, and inconvenience. If this task were to be neglected, the trap itself would become ineffectual. Second, poisonous insecticide was required for the operation of this device. When poison is used, the danger always exists that unintended animals or humans may come into contact with the poison, and deleterious health consequences ensue.

Thus, it would be desirable to provide an insect trap and method which does not require an external power source, which is simple, and which does not require poison in its use.

SUMMARY OF THE INVENTION

Accordingly, it is an object of the present invention to provide an insect trap and method which permits carbon dioxide exhaled by humans, lactic acid and other chemicals emitted from humans to emanate from human-occupied structures, lure insects into a maze, and entrap the insects within the maze. Design features allowing this object to be accomplished include an insect trap mounted in a structure opening, the insect trap having a front wall aperture leading into a series of chambers, and an inner chamber having rear wall apertures communicating with the inside of the structure. Advantages associated with the accomplishment of this object include entrapping insects by using naturally-occurring carbon dioxide exhaled by humans, lactic acid and other chemicals emitted from humans as insect lure, no need for external power, and no need for toxic insecticides with their associated health hazards.

It is another object of the present invention to provide an insect trap and method which is simple in design. Design features allowing this object to be accomplished include rigidly attached front, rear and side walls, a roof and a floor, a series of internal dividers, a front wall aperture, and a plurality of rear wall apertures. Benefits associated with the accomplishment of this object include ease of use, simple installation, reduced maintenance requirements, and the associated cost savings.

It is still another object of this invention to provide an insect trap and method which may quickly and easily be installed in an existent structure opening. Design features enabling the accomplishment of this object include a roof, floor, and sidewalls which may be sandwiched between existing structure opening covers such between as a window and a windowsill, and at least one screen attached to a side wall. Advantages associated with the realization of this object include time and cost savings when installing the insect trap.

It is another object of the present invention to provide an insect trap and method which forces insects to pursue a serpentine pathway when back-tracking carbon dioxide exhaled by humans, lactic acid and other chemicals emitted from humans, which emanate through and out of the insect trap. Design features allowing this object to be accomplished include a front wall, a series of internal dividers, and a rear wall. Sequential internal dividers depend alternatingly between the floor and the roof, thus providing a series of divider openings which are disposed alternatingly adjacent the roof and the floor, through which insects must pass. A benefit associated with the accomplishment of this object is the ability to entrap insects in an inner chamber, unable to proceed further because the inner chamber terminates in a rear wall having rear wall apertures sized too small to admit insects.

It is yet another object of this invention to provide an insect trap method which entices insects into an insect trap and entraps them there without the use of insecticide or outside power. Method steps permitting the achievement of this object include mounting an insect trap in a structure opening, allowing insect-enticing chemicals to waft from inside the structure opening to outside the structure opening through the insect trap, enticing the insects through a front wall aperture, divider apertures, and into an inner chamber adjacent a rear wall, and entrapping the insects within the inner chamber because the rear wall apertures are too small to admit passage to the insects.

It is yet another object of this invention to provide an insect trap which is inexpensive and simple to produce. Design features allowing this object to be achieved include the use of components made of readily available materials. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Four sheets of drawings are provided. Sheet one contains FIG. 1. Sheet two contains FIGS. 2 and 3. Sheet three contains FIG. 4. Sheet four contains FIGS. 5 and 6.

DETAILED DESCRIPTION OF THE PREFERRED EMBODIMENT

Figure 1:
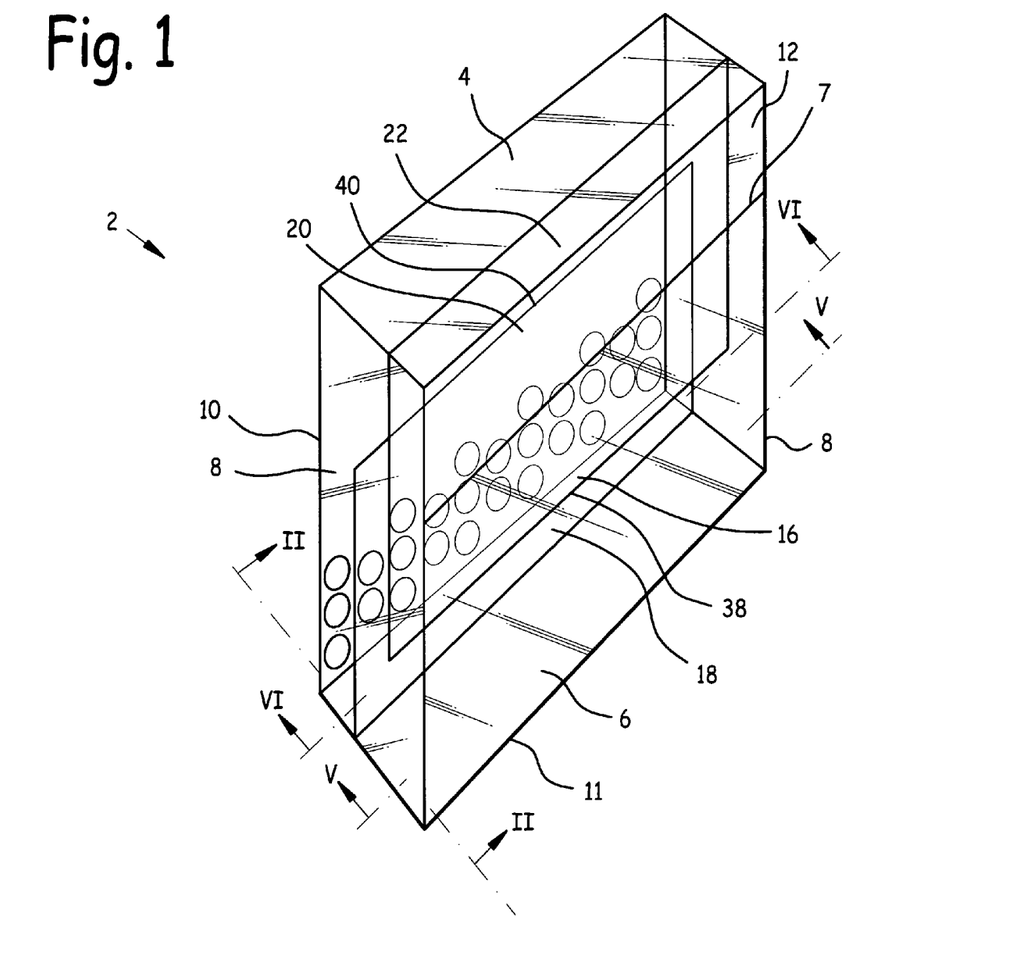
FIG. 1 is a front quarter elevated isometric view of an insect trap.

Referring now to FIG. 1 we observe a front quarter elevated isometric view of insect trap 2. Insect trap 2 comprises roof 4 rigidly attached to rear wall 10 and side walls 8, front wall 6 rigidly attached along edges of side walls 8 opposite rear wall 10, and floor 11 rigidly attached along edges of front wall 6, rear wall 10, and side walls 8 opposite roof 4.

First divider 16 depends from roof 4, and is attached at either side to a side wall 8. Second divider 20 as attached to floor 11, and at either side to a side wall 8.

Front wall aperture 12 is disposed between front wall upper edge 7 and roof 4. First divider aperture 18 is disposed between first divider lower edge 38 and floor 11. Second divider aperture 22 is disposed between second divider upper edge 40 and roof 4. Rear wall apertures 14 are disposed in rear wall 10.

Figure 2:
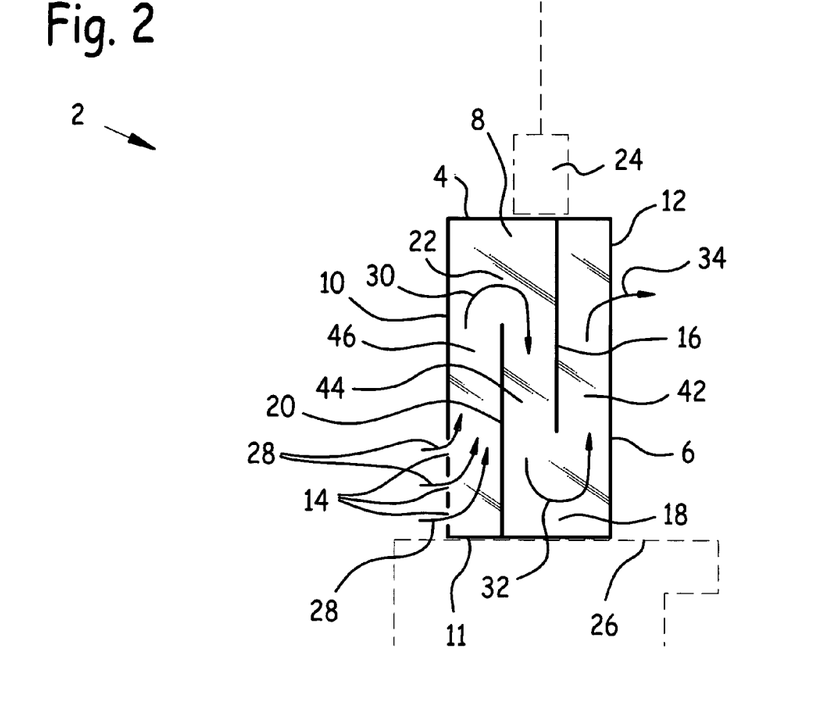
FIG. 2 is a side cross-sectional view of an insect trap taken at section II-II of FIG. 1, mounted in a structure opening.

Referring now also to FIG. 2, a side cross-sectional view of insect trap 2 taken at section II-II of FIG. 1, outer chamber 42 is defined by front wall 6, first divider 16, roof 4, floor 11, and side walls 8. Middle chamber 44 is defined by first divider 16, second divider 20, roof 4, floor 11, and side walls 8. Inner chamber 46 is defined by second divider 18, rear wall 10, roof 4, floor 11, and side walls 8.

Figure 3:
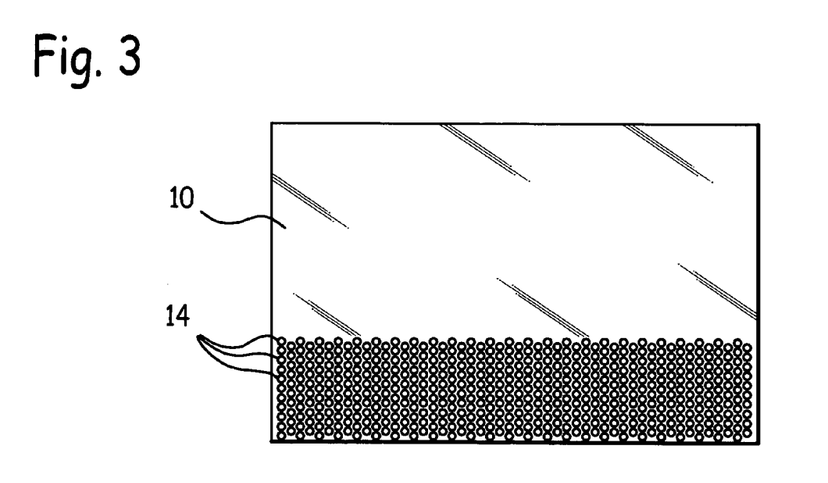
FIG. 3 is a rear view of an insect trap.

FIG. 3 is a rear view of insect trap 2. Rear wall 10 contains a plurality of rear wall apertures 14, which permit passage of insect-enticing chemicals emitted from humans and their living environment, such as carbon dioxide exhaled, lactic acid, etc. As may be observed in FIG. 2, these chemicals waft from the inside of the structure to the outside through insect trap 2 as indicated by arrows 28, 30, 32 and 34. First the chemicals enter insect trap 2 into inner chamber 46 through rear wall apertures 14 as indicated by arrows 28. Then the chemicals exit inner chamber 46 into middle chamber 44 through second divider aperture 22 as indicated by arrow 30. Next, the chemicals exit middle chamber 44 into outer chamber 42 through first divider aperture 18 as indicated by arrow 32. Finally, the chemicals emerge from outer chamber 42 through front wall aperture 12 as indicated by arrow 34.

At this stage, mosquitoes and other insects in the exterior of a structure to which insect trap 2 is mounted become aware of the insect-enticing chemicals emitted from humans wafting from front wall aperture 12, and attracted by same, retrace the path indicated by arrow 28-34. First, the insects enter outer chamber 42 through front wall aperture 12, opposite arrow 34. Then the insects travel from outer chamber 42 into middle chamber 44 through first divider aperture 18, opposite arrow 32. Then, the insects travel from middle chamber 44 into inner chamber 46 through second divider aperture 22 opposite arrow 30. Because rear wall apertures 14 are too small for insects to travel through, the insects remain entrapped within inner chamber 46, lured towards the inside of the structure by the enticing chemicals just beyond rear wall 10, but unable to progress further.

Note that the passage of chemicals wafting from the inside of a structure to which insect trap 2 is mounted is channeled by front wall 6, dividers 16 and 20, and rear wall 10, all of which are constructed of impermeable material, as are roof 4, side walls 8 and floor 11. Because these components are made of impermeable material, the path of chemicals emanating from the structure through insect trap 2 is serpentine and maze-like as indicated by arrows 28-34. Conversely, the path taken by insects attempting to enter the structure through insect trap 2 (opposite arrows 28-34) is also serpentine and maze-like, terminating in inner chamber 46. Insects traveling into inner chamber 46 remain entrapped there, confused by the maze provided by front wall 6, dividers 16 and 20, and rear wall 10.

Although in interest of simplicity, the instant drawings depict only two dividers 16 and 20, it is intended to fall within the scope of this disclosure that any number of dividers may be mounted inside insect trap 2, alternately mounted to roof 4 and floor 11, thus providing divider apertures which alternate between being adjacent floor 11 and roof 4. Incorporation of additional dividers would increase the complexity of the maze, from the insect's point of view.

Accordingly, the instant method comprises the steps of:
A. Permitting insect-enticing chemicals to travel from a structure interior to a structure exterior through the insect trap;
B. Enticing an insect towards the insect trap using the insect-enticing chemicals;
C. Enticing the insect through the front wall opening into the outer chamber;
D. Enticing the insect from the outer chamber, through the first divider aperture, and into the middle chamber;

E. Enticing the insect from the middle chamber, through the second divider aperture, and into the inner chamber; and
F. Entrapping the insect within the inner chamber by means of the rear wall and the rear wall apertures which are sized too small to admit passage to the insect.

As may be observed in FIG. 2, the instant insect trap 2 may be quickly and easily mounted in a window opening simply by raising window 24, positioning insect trap 2 as desired in the opening between window 24 and window sill 26, and then lowering window 24 to entrap insect trap 2 between window 24 and window sill 26.

Figure 4:
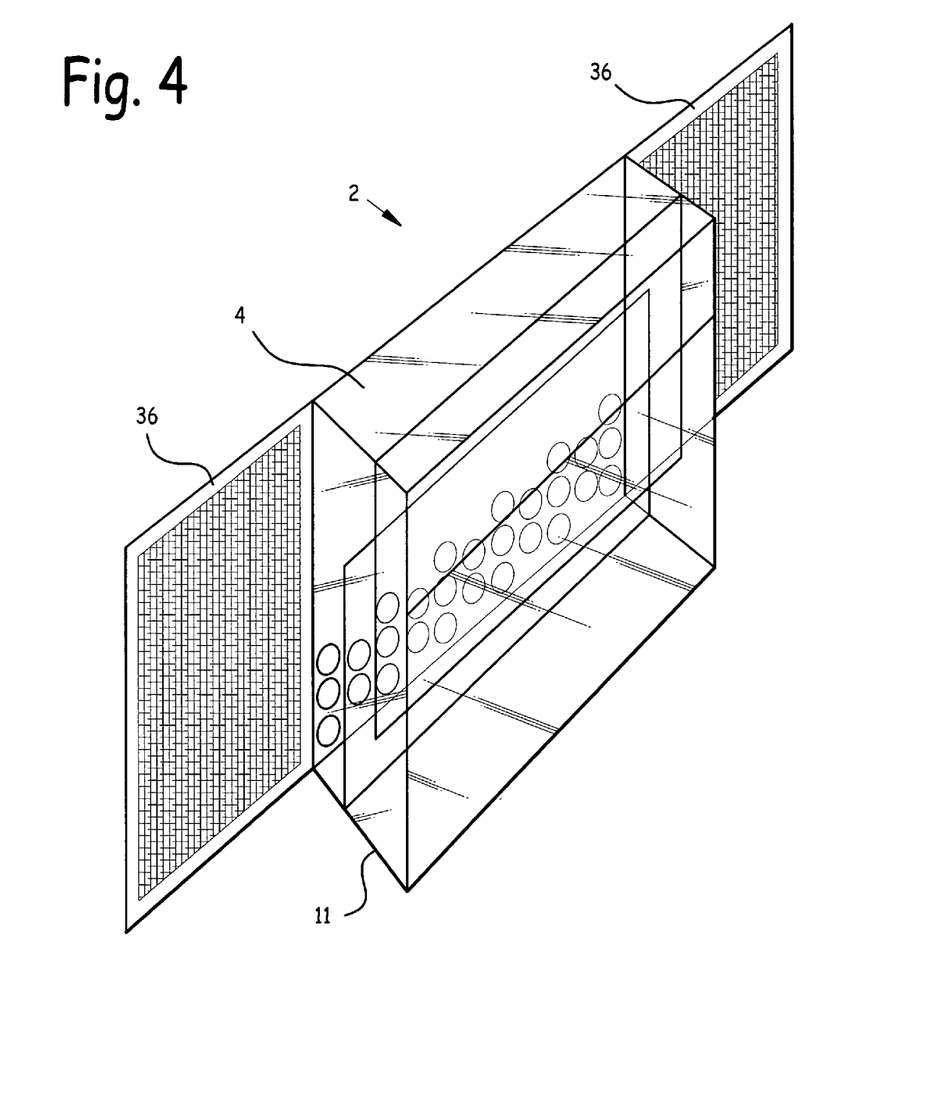
FIG. 4 is a front quarter elevated isometric view of an insect trap with side screens.

Although FIG. 2 illustrates the instant insect trap 2 mounted in a window, it is intended to fall within the scope of this disclosure that insect trap 2 may be mounted in any structure opening, with or without the side screens 36 depicted in FIG. 4. Such structure openings may include windows, doors, vents, etc.

Should the window opening be wider than insect trap 2, insect trap 2 may be equipped with side screens 36, as may be observed in FIG. 4. FIG. 4 is a front quarter elevated isometric view of insect trap 2 with side screens 36. Although FIG. 4 shows side screens 36 mounted on side walls 8 towards the rear of insect trap 2, it is intended to fall within the scope of this disclosure that side screens 36 may be mounted anywhere on side walls 8 as desired to fit a given window opening or other structure opening.

Figure 5:
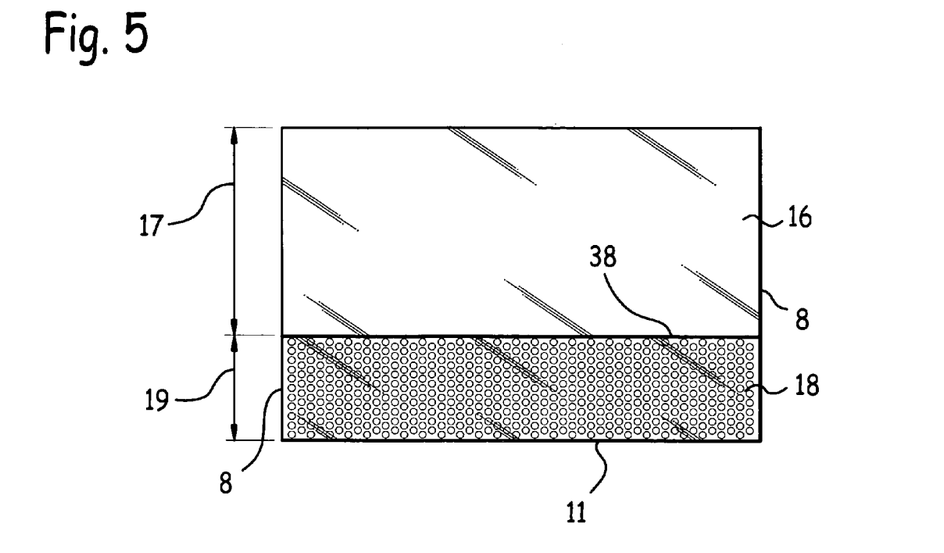
FIG. 5 is a front cross-sectional view of an insect trap taken at section V-V of FIG. 1.

FIG. 5 is a front cross-sectional view of insect trap 2 taken at section V-V of FIG. 1. First divider aperture 18 is defined by first divider lower edge 38, floor 11, and side walls 8. In the preferred embodiment, first divider aperture height 19 was 70%±10% of first divider height 17. As may also be observed in FIG. 5, the area of rear wall 10 populated by rear wall apertures 14 was defined by floor 11 and side walls 8, and extended upwards away from floor 11 a distance substantially equal to first divider aperture height 19. Thus, in the preferred embodiment, the height of the area of rear wall 10 populated by rear wall apertures 14 was substantially equal to first divider aperture height 19.

Figure 6:
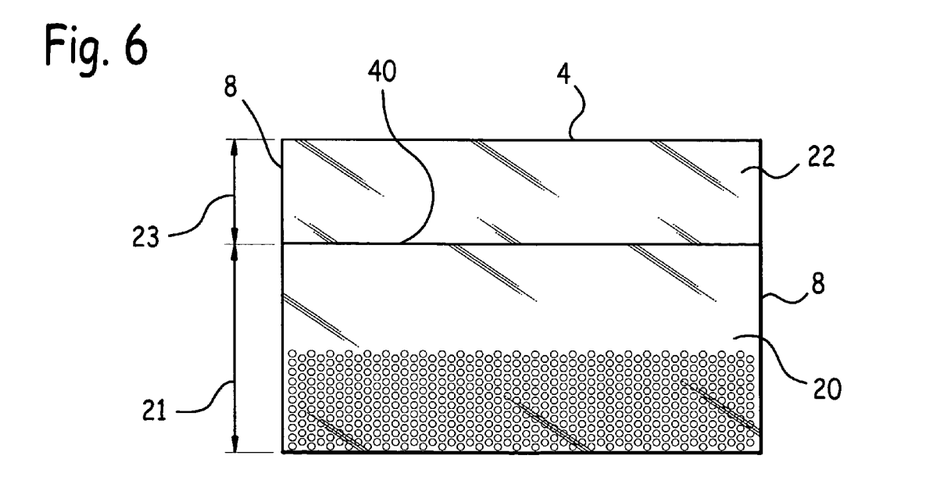
FIG. 6 is a front cross-sectional view of an insect trap taken at section VI-VI of FIG. 1.

FIG. 6 is a front cross-sectional view of insect trap 2 taken at section VI-VI of FIG. 1. Second divider aperture 22 is defined by second divider upper edge 40, roof 4, and side walls 8. In the preferred embodiment, second divider aperture height 23 was 70%±10% of second divider height 21. In the preferred embodiment, a height of front wall aperture 12 was substantially equal to second divider aperture height 23.

While the drawings illustrate only two dividers inside insect trap 2, it is intended to fall within the scope of this disclosure that any number of dividers may be disposed within insect trap 2 in order to further confuse and entrap insects within its interior. A divider aperture is associated with each divider. Successive divider openings typically alternate between being adjacent floor 11 and roof 4, thus forcing insects to describe a serpentine pathway through insect trap 2 from front wall aperture 12 in their journey towards rear wall 10 and its associated inner chamber 46.

In the preferred embodiment, front wall aperture 12 was adjacent roof 4, in part because insects naturally crawl upwards. Thus, an insect walking on the outside surface of front wall 6 will tend to crawl upwards until reaching front wall upper edge 7, and then tend to progress into outer chamber 42, where it is already preliminarily entrapped.

In the preferred embodiment, insect trap 2 was made of impermeable material such as clear Plexiglas, plastic, or other appropriate material. Rear wall apertures were bores approximately 2 millimeters in diameter, although this could vary depending on the species insect to be trapped.

While a preferred embodiment of the invention has been illustrated herein, it is to be understood that changes and variations may be made by those skilled in the art without departing from the spirit of the appending claims.

| DRAWING ITEM INDEX | |
| --- | --- |
| 2 | insect trap |
| 4 | roof |
| 6 | front wall |
| 7 | front wall upper edge |
| 8 | side wall |
| 10 | rear wall |
| 11 | floor |
| 12 | front wall aperture |
| 14 | rear wall aperture |
| 16 | first divider |
| 17 | first divider height |
| 18 | first divider aperture |
| 19 | first divider aperture height |
| 20 | second divider |
| 21 | second divider height |
| 22 | second divider aperture |
| 23 | second divider aperture height |
| 24 | window |
| 26 | window sill |
| 28 | arrow |
| 30 | arrow |
| 32 | arrow |
| 34 | arrow |
| 36 | screen |
| 38 | first divider lower edge |
| 40 | second divider upper edge |
| 42 | outer chamber |
| 44 | middle chamber |
| 46 | inner chamber |

We claim:

1. An insect trap comprising a side wall attached along each side of a front wall, a rear wall rigidly attached to said side walls opposite said front wall, a floor rigidly attached along bottom edges of said front wall, said rear wall, and said side walls, a roof rigidly attached along top edges of said rear wall and said side walls, opposite said floor, a front wall aperture in said front wall, at least one rear wall aperture in said rear wall, at least one divider within said insect trap, and a divider aperture associated with each said at least one divider, wherein said at least one divider comprises a first divider bounded by said roof and said side walls, said first divider depending from said roof and terminating at a first divider lower edge located above said floor, and said divider aperture is a first divider aperture defined by said first divider lower edge, said side walls, and said floor, and wherein said at least one divider further comprises a second divider bounded by said floor and said side walls, said second divider extending upwardly from said floor and terminating at a second divider upper edge located below said roof, and said divider aperture is a second divider aperture defined by said second divider upper edge, said roof, and said side walls, said second divider being disposed between said first divider and said rear wall, said front wall aperture and each said divider aperture being sized to admit passage to insects, said at least one rear wall aperture sized to prevent passage of insects.

2. The insect trap of claim 1 wherein a first divider aperture height is 70%±10% of a first divider height, and a second divider aperture height is 70%±10% of a second divider height.

3. The insect trap of claim 2 wherein a height of said front wall aperture is substantially the same as said second divider aperture height, and a height of an area of said rear wall populated by said at least one rear wall aperture is substantially the same as said first divider aperture height.

4. The insect trap of claim 1 further comprising a screen attached along each said side wall, whereby said insect trap may be quickly and easily installed in a window or other structure opening.

5. The insect trap of claim 1 wherein said roof, front wall, side walls, rear wall, at least one divider, and floor are made of impermeable material impervious to the passage of air.

6. An insect trap comprising a side wall attached along each side of a front wall, a rear wall rigidly attached to said side walls opposite said front wall, a floor rigidly attached along bottom edges of said front wall, said rear wall, and said side walls, a roof rigidly attached along top edges of said rear wall and said side walls, opposite said floor, a front wall aperture in said front wall, at least one rear wall aperture in said rear wall, a first divider bounded by said roof and said side walls, said first divider depending from said roof and terminating at a first divider lower edge located above said floor, a first divider aperture defined by said first divider lower edge, said side walls, and said floor, a second divider bounded by said floor and said side walls, said second divider extending upwardly from said floor and terminating at a second divider upper edge located below said roof, and a second divider aperture defined by said second divider upper edge, said roof, and said side walls, said second divider being disposed between said first divider and said rear wall, said front wall aperture, said first divider aperture and said second divider aperture being sized to admit passage to insects, said at least one rear wall aperture being sized to deny passage to insects.

7. The insect trap of claim 6 wherein said front wall aperture is disposed adjacent said roof.

8. The insect trap of claim 7 wherein said at least one rear wall aperture is disposed adjacent said floor.

9. The insect trap of claim 8 further comprising an outer chamber between said front wall and said first divider, a middle chamber between said first divider and said second divider, and an inner chamber disposed between said second divider and said rear wall, said outer chamber communicating with an exterior of said insect trap through said front wall aperture and with said middle chamber through said first divider aperture, said middle chamber communicating with said outer chamber through said first divider aperture and with said inner chamber through said second divider aperture, and said inner chamber communicating with said middle chamber through said second divider aperture and with an exterior of said insect trap through said at least one rear wall aperture.

10. The insect trap of claim 9 wherein a first divider aperture height is 70%±10% of a first divider height, and a second divider aperture height is 70%±10% of a second divider height.

11. The insect trap of claim 10 wherein a height of said front wall aperture is substantially the same as said second divider aperture height, and a height of an area of said rear wall populated by said at least one rear wall aperture is substantially the same as said first divider aperture height.

12. The insect trap of claim 9 wherein said roof, front wall, side walls, rear wall, first and second dividers, and floor are made of impermeable material impervious to the passage of air.

13. The insect trap of claim 6 further comprising a screen attached along each said side wall, whereby said insect trap may be quickly and easily installed in a window or other structure opening.

14. An insect trap comprising a side wall attached along each side of a front wall, a rear wall rigidly attached to said side walls opposite said front wall, a floor rigidly attached along bottom edges of said front wall, said rear wall, and said side walls, a roof rigidly attached along top edges of said side walls and said rear wall, opposite said floor, a front wall aperture in said front wall, at least one rear wall aperture in said rear wall, said at least one rear wall aperture being sized too small to admit passage to insects, a plurality of dividers inside said insect trap, and a divider aperture associated with each said divider, successive said dividers alternately depending from said roof and extending upwardly from said floor, successive said divider apertures being disposed alternately adjacent said roof and said floor, each said divider depending from said roof terminating at a divider lower edge located above said floor, each said divider aperture associated with each said divider depending from said roof being defined by said divider lower edge, said side walls, and said floor, each said divider extending upwardly from said floor terminating at a divider upper edge located below said roof, each said divider aperture associated with each said divider extending upwardly from said floor being defined by said divider upper edge, said side walls, and said roof, said front wall aperture and each said divider aperture being sized to admit passage to insects.

15. The insect trap of claim 14 wherein said front wall aperture is disposed adjacent said roof and said at least one rear wall aperture is disposed adjacent said floor.

16. The insect trap of claim 15 wherein one of said divider apertures is adjacent said front wall and is disposed adjacent said floor, and one of said divider apertures next in succession toward said rear wall is disposed adjacent said roof.

17. The insect trap of claim 15 wherein one of said divider apertures is adjacent said rear wall and is disposed adjacent said roof.

18. A method of trapping insects with an insect trap, said insect trap comprising a side wall attached along each side of a front wall, a rear wall rigidly attached to said side walls opposite said front wall, a floor rigidly attached along bottom edges of said front wall, said rear wall, and said side walls, a roof rigidly attached along top edges of said side walls and said rear wall, opposite said floor, a front aperture in said front wall, at least one rear wall aperture in said rear wall, a first divider bounded by said roof and said side walls, said first divider depending from said roof and terminating at a first divider lower edge located above said floor, a first divider aperture defined by said first divider lower edge, said side walls, and said floor, a second divider bounded by said side walls and said floor, said second divider extending upwardly from said floor and terminating at a second divider upper edge located below said roof, and a second divider aperture defined by said second divider upper edge, said roof, and said side walls, said second divider being disposed between said first divider and said rear wall, an outer chamber between said front wall and said first divider, a middle chamber between said first divider and said second divider, and an inner chamber disposed between said second divider and said rear wall, said outer chamber communicating with an exterior of said insect trap through said front wall aperture and with said middle chamber through said first divider aperture, said middle chamber communicating with said outer chamber through said first divider aperture and with said inner chamber through said second divider aperture, and said inner chamber communicating with said middle chamber through said second divider aperture and with an exterior of said insect trap through said at least one rear wall aperture, said insect trap made of impermeable material, said front wall aperture, said first divider aperture and said second divider aperture being sized to admit passage to insects, said at least one rear wall aperture being sized to deny passage to insects, said method comprising the steps of:
- A. Mounting said insect trap in a structure opening;
- B. Permitting insect-enticing chemicals to travel from an inside of said structure opening to an outside of said structure opening, through said insect trap;
- C. Enticing an insect disposed outside said structure opening towards said insect trap using said insect-enticing chemicals;
- D. Enticing the insect through said front wall aperture into said outer chamber;
- E. Enticing said insect from said outer chamber, through said first divider aperture, and into said middle chamber;
- F. Enticing said insect from said middle chamber, through said second divider aperture, and into said inner chamber; and
- G. Entrapping said insect within said inner chamber by means of said rear wall and said at least one rear wall aperture, said at least one rear wall aperture being sized too small to admit passage to said insect.

19. A method of trapping insects with an insect trap, said insect trap comprising a side wall attached along each side of a front wall, a rear wall rigidly attached to said side walls opposite said front wall, a floor rigidly attached along bottom edges of said front wall, said rear wall, and said side walls, a roof rigidly attached along top edges of said side walls and said rear wall, opposite said roof, a front wall aperture in said front wall, at least one rear wall aperture in said rear wall, said at least one rear wall aperture being sized too small to admit passage to insects, a plurality of dividers inside said insect trap, and a divider aperture associated with each of said dividers, successive said dividers alternately depending from said roof and extending upwardly from said floor, successive said divider apertures being disposed alternately adjacent said roof and said floor, each said divider depending from said roof terminating at a divider lower edge located above said floor, each said divider aperture associated with each said divider depending from said roof being defined by said divider lower edge, said side walls, and said floor, each said divider extending upwardly from said floor terminating at a divider upper edge located below said roof, each said divider aperture associated with each said divider extending upwardly from said floor being defined by said divider upper edge, said side walls, and said roof, said front wall aperture and each said divider aperture being sized to admit insects, said method comprising the steps of:
- A. Mounting said insect trap in a structure opening;
- B. Permitting insect-enticing chemicals to travel from an interior of said structure opening to an exterior of said structure opening, through said insect trap;
- C. Enticing an insect disposed outside said structure opening towards said insect trap using said insect-enticing chemicals;
- D. Enticing said insect through said front wall opening;
- E. Enticing said insect through successive said divider openings en route towards said rear wall;
- F. Enticing said insect into an inner chamber disposed between said rear wall and one of said dividers which is adjacent said rear wall; and
- G. Entrapping said insect within said inner chamber by means of said rear wall and said at least one rear wall aperture, said at least one rear wall aperture being sized too small to admit passage of said insect.

20. The method of claim 19 wherein said insect trap further comprises a side screen attached to at least one of said side walls, said structure opening is a window, and said method comprises the further steps of opening said window sufficiently to admit said insect trap, placing said insect trap in said window so that a width of said insect trap and said at least one side screen is substantially equal to a width of said window, and then sliding said window closed until said window is in contact with said insect trap, thereby preventing passage of insects through said structure opening other than into said insect trap.

* * * * *